United States Patent [19]

Nihei et al.

[11] Patent Number: 5,375,480

[45] Date of Patent: Dec. 27, 1994

[54] CABLE LAYING ARRANGEMENT FOR THE ROBOT ARM UNIT OF AN INDUSTRIAL ROBOT

[75] Inventors: Ryo Nihei, Fujiyoshida; Masayuki Hamura; Masanao Miyawaki, both of Minamitsuru, all of Japan

[73] Assignee: Fanuc, Ltd., Yamanashi, Japan

[21] Appl. No.: 157,147

[22] PCT Filed: Apr. 28, 1993

[86] PCT No.: PCT/JP93/00565

§ 371 Date: Dec. 14, 1993

§ 102(e) Date: Dec. 14, 1993

[87] PCT Pub. No.: WO93/22109

PCT Pub. Date: Nov. 11, 1993

[30] Foreign Application Priority Data

Apr. 28, 1992 [JP] Japan ................ 4-110203

[51] Int. Cl.⁵ ............................................. B25J 18/00
[52] U.S. Cl. .............................. 74/479 BE; 74/479 BP; 901/23; 901/50
[58] Field of Search ........ 74/479 B, 479 BE, 479 BP; 901/19, 23, 27, 50

[56] References Cited

U.S. PATENT DOCUMENTS 4,659,279 4/1987 Akeel et al. .................... 901/50 X
4,955,250 9/1990 Fisher ............................. 901/50 X
4,969,795 11/1990 Toyoda et al. ................... 901/50 X

FOREIGN PATENT DOCUMENTS 0187862 7/1986 European Pat. Off. .
0535604A1 4/1993 European Pat. Off. .
58-191979 12/1983 Japan .
61-121882 6/1986 Japan .
63-185596 8/1988 Japan .
3-47997 7/1991 Japan .

*Primary Examiner*—Allan D. Herrmann
*Attorney, Agent, or Firm*—Nikaido Marmelstein Murray & Oram

[57] ABSTRACT

An industrial robot is provided with a cable laying arm (20) extended on one side of a robot trunk (12) so as to form a dual arm structure in combination with a structural arm (18) extended on the other side of the robot trunk (12). A bundle (58) of cables capable of being detachably connected to the robot unit is extended in the cable housing element (50) of the cable laying arm (20) so that the cables including power supply cables and signal transmission cables are not exposed to the outside. The whole cable housing element (50) can be readily removed from the robot trunk (12) together with the bundle (58) of cables, in case any one of the cables is disconnected, to permit repair of the disconnected cable.

6 Claims, 2 Drawing Sheets

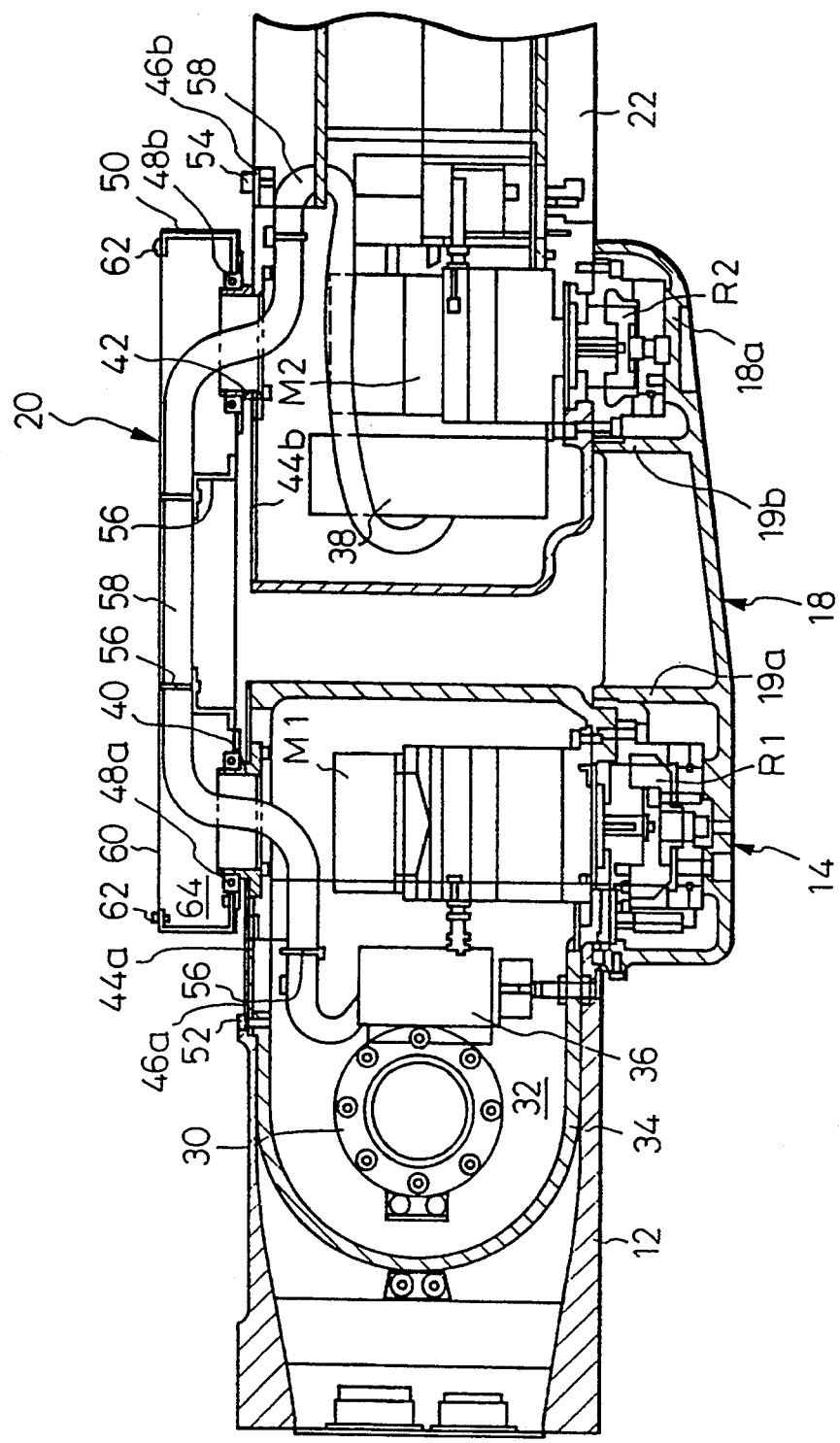

CABLE LAYING ARRANGEMENT FOR THE ROBOT ARM UNIT OF AN INDUSTRIAL ROBOT

TECHNICAL FIELD

The present invention relates to improvements in the construction of an industrial robot and, more particularly, to a cable laying arrangement capable of laying power supply cables and signal transmission cables within a robot arm unit of an industrial multi-articulated robot without exposing the power supply cables and the signal transmission cables outside the robot unit of the industrial articulated robot.

BACKGROUND ART

Cable laying arrangements for industrial articulated robots incorporate various devices for laying power supply cables and signal transmission cables on the industrial articulated robots. Most of these conventional cable laying arrangements for industrial robots lay cables extended through the robot base and the robot trunk directly within the robot arm unit serving as a structural element that supports loads, such as a robot wrist and an end effector as well as a functional element for robot actions.

A well-known cable laying arrangement arranges tubing, such as known conduits, on the side surface of the robot unit and runs power supply cables and signal transmission cables through the tubing to avoid laying the power supply cables and the signal transmission cables in an exposed state on the exterior of the robot unit from the view point of securing safety and avoiding spoiling the appearance of the robot unit.

Another known cable laying arrangement which avoids exposing cables runs a bundle of cables through cable bearers available on the market, such as CABLEBEAR (Trademark of Tsubakimoto Chain Co. in Japan), capable of following the swing motion and the linear motion of the robot arm, i.e., the structural element of the robot unit, and attached to the exterior and the like of the robot arm.

The known cable laying arrangement that runs the cables through the robot arm unit needs a series of very troublesome assembly operations and a lot of time, in case of failures, such as failure in supplying power or failure in transmitting signals, is needed to replace the faulty cables with new ones by pulling out the faulty cables from the robot arm and the structural elements, and to lay the new cables within the robot arm unit.

The known cable laying arrangement employing tubing needs, when the wires of the power supply cables and the signal transmission cables are provided with connectors at their opposite ends, to remove all the connectors from the wires of the cables, to draw out all the cables from the tubing and, eventually, to replace the bundle of cables with a new bundle of cables even if only a single one of the wires of one of the cables is disconnected, which costs a great deal.

The known cable laying arrangement employing cable bearers, arranging the cable bearers on the exterior of the robot unit, such as the exterior of the robot arm unit, and holding the bundle of cables within the cable bearers suffers from problems that dust and oil mists leak through gaps in the cable bearers into the cable bearers and adhere to the surface of the cables of the bundle to deteriorate the cables when the industrial robot is used in a foul atmosphere containing floating particles of dust, paint and oil, because the cable bearers are not air-tight.

DISCLOSURE OF THE INVENTION

Accordingly, it is a primary object of the present invention to provide a cable laying arrangement for the robot arm unit of an industrial robot, capable of laying and holding power supply cables and signal transmission cables within the robot arm in a substantially air-tight fashion so that the cables are not exposed and of enabling repairing the cables by comparatively simple work in case any one of the wires of the cables is disconnected or any failure occurs in the cables.

Another object of the present invention is to provide an industrial multi-articulated robot provided with a cable laying arm unit internally having a cable chamber, combined with the robot arm unit, i.e., a structural element for robot actions and for supporting a load, to form a dual arm structure and pivotally and detachably connected to the robot trunk.

According to the present invention, in an industrial robot comprising a robot base, a robot trunk set on the robot base, a robot arm means pivotally connected to the robot trunk by a joint, a robot wrist connected to the extremity of the robot arm means, an end effector connected to the robot wrist, and a cable laying means for laying power supply cables and signal transmission cables from the robot arm means to the robot wrist and the end effector, the robot arm means is provided with a structural arm member capable of being driven for a swing motion about the axis of the joint by the rotative driving force of a drive source, and the cable laying means is provided with a cable laying arm pivotally and detachably connected to the robot trunk by the joint, and combined with the structural arm member so that the cable laying arm and the structural robot arm member are disposed respectively on the opposite sides of the robot trunk, operatively interlocked with the structural arm member, and having a cable chamber in which cables are extended and a cable passage formed in the central portion of the joint.

The robot arm means is further provided with a second structural arm member pivotally connected to the extremity of the afore-mentioned structural arm member by another joint, each of the cables contained in the cable chamber of the cable laying arm of the cable laying means has one end fixedly provided with a first connector to be detachably connected to a connector provided within the robot trunk and the other end fixedly provided with a second connector to be detachably connected to a connector provided within the second structural arm member.

In the industrial robot having the above-mentioned structure, a bundle of power supply cables or signal transmission cables is contained in the cable chamber of the cable laying arm cooperating with the robot arm means. Thus, the cables are not exposed to the exterior. In addition, since the cable laying arm is a detachable unitary structure, the cable laying arm can be replaced with another normal cable laying arm when failure, such as the disconnection of the wire of the cable, occurred in the cables, by removing only the cable laying arm from the industrial robot and putting the normal cable laying arm on the industrial robot, which curtails the downtime of the industrial robot and the cables can be pulled out from the cable chamber of the removed cable laying arm for perfect repair.

BRIEF DESCRIPTION OF THE DRAWINGS

The above and other objects, features and advantages of the present invention will be described in detail in terms of preferred embodiments shown in the accompanying drawings, in which:

FIG. 2 is a sectional view showing the internal structures of the industrial articulated robot of FIG. 1.

BEST MODE FOR CARRYING OUT THE INVENTION

Figure 1:
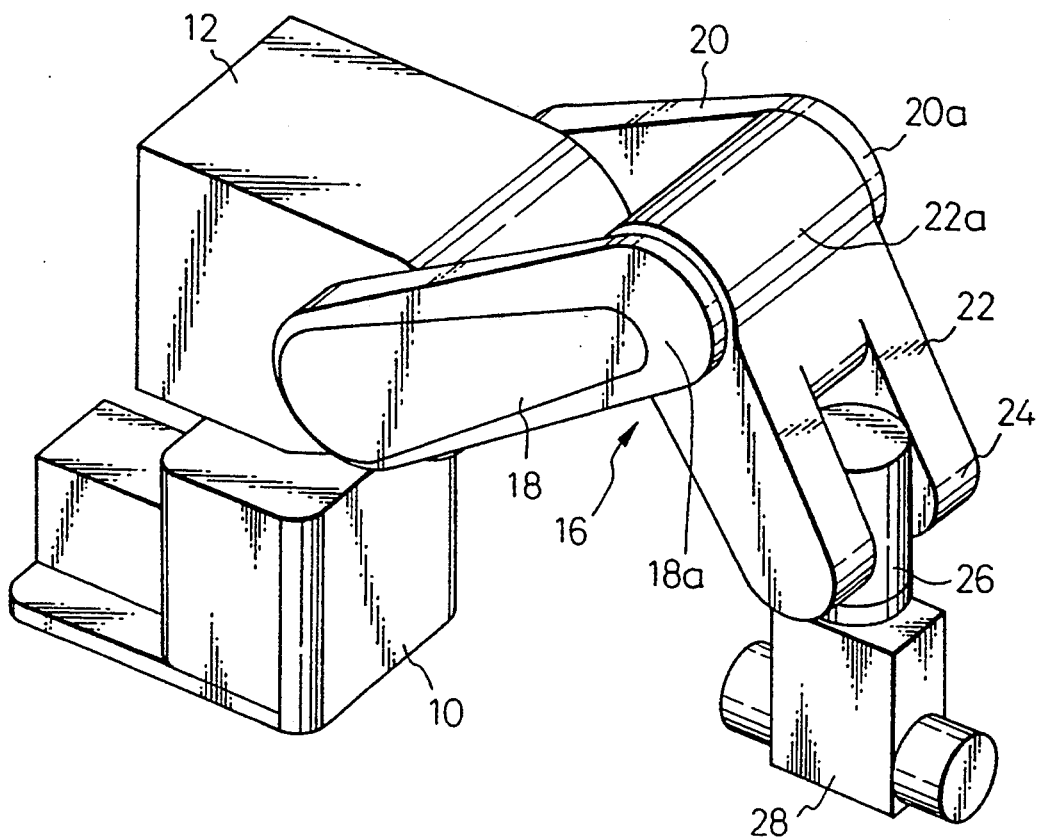
FIG. 1 is a perspective view of an industrial articulated robot in a preferred embodiment according to the present invention provided with a structural arm member and a cable laying arm combined in a dual arm structure.

Referring to FIG. 1 showing a preferred embodiment of the present invention, an industrial multi-articulated robot has a robot base 10, a robot trunk 12 set on and pivotally connected for turning about its vertical axis to the robot base 10, a robot arm unit 16 pivotally connected for turning about a horizontal axis to the robot trunk by a joint 14 disposed at a position suitable for action on the robot trunk 12, such as the upper end of the robot trunk 12, a robot wrist pivotally connected to the extremity of the robot arm unit 16 by a joint 24, and an end effector 28 pivotally connected to the robot wrist 26.

The robot arm unit 16 has a first structural arm 18 disposed on one side of the robot trunk 12 and pivotally connected to the robot trunk 12 by the joint 14, and a cable laying arm 20 disposed opposite to the first structural arm 18 with respect to the robot trunk 12. The robot arm unit 16 has also a second structural arm 22 having a rear end serving as a joint connecting the second structural arm 22 to the front end 18a of the first structural arm 18 and the extremity 20a of the cable laying arm 20 so that the second structural arm 22 is able to swing about a horizontal axis relative to the first structural arm 18. The industrial articulated robot in this embodiment is an industrial, vertical, articulated robot.

Referring to FIG. 2, the robot trunk 12 has a box structure 34 housing a rotary functional unit for turning actions about a vertical axis including a vertical rotary shaft 30 and defining a chamber 32 surrounding the rotary shaft 30. A holding member 36 for fixedly holding an electric connector is attached to the rotary shaft 30.

A drive motor M1 for driving the first structural arm 18 is disposed within the chamber 32 and attached to the inner surface of the side wall of the box structure 34. The output shaft of the drive motor M1 is coupled with the input element of a reducer R1 disposed within the base end of the first structural arm 18 of the robot arm unit 16, and the output element of the reducer R1 is connected directly to the first structural arm 18.

The first structural arm 18 is provided internally with ribs 19a and 19b so that the first structural arm 18 is capable of serving as a strong arm element having a mechanical strength large enough to support load including the second structural arm 22 connected to the extremity thereof.

The second structural arm 22 of the robot arm unit 16 is internally provided in its rear end 22a with a drive motor M2 for driving the second structural arm 22. The output shaft of the drive motor M2 is connected to the input element of a coaxial reducer R2 disposed within a space between the interior of the front end 18a of the first structural arm 18 and the interior of the rear end of the second structural arm 22, and the output element of the reducer R2 is connected directly to the second structural arm 22.

A holding member 38 for fixedly holding an electric connector is provided within the rear end of the second structural arm 22.

The cable laying arm 20 has one end connected to one side wall of the robot trunk 12, opposite the other side wall to which the first structural arm 18 is joined pivotally, and the other end connected to the rear end 22a of the second structural arm 22. The cable laying arm 20 is comprised of two base elements 46a and 46b formed by fastening two hollow shafts 40 and 42 forming cable passages to plate members 44a and 44b formed by working a metal sheet with suitable fastening means, such as bolts, respectively, rotary bearings 48a and 48b mounted on the hollow shafts 40 and 42 of the base elements 46a and 46b, respectively, and a cable housing element 50 put on the rotary bearings 48a and 48b. The former base element 46a is fixed to the robot trunk 12 with a plurality of bolts 52, and the latter base element 46b is fixed to the side surface of the second structural arm 22 with a plurality of bolts 54. Thus, the cable housing element 50, similarly to the first structural arm 18, is able to turn on the rotary bearings 48a and 48b relative to the robot trunk 12 and the second structural arm 22. The hollow shaft 40 is coaxial with the output element of the reducer R1 for the first structural arm 18, and the hollow shaft 42 is coaxial with the output element of the reducer R2 for the second structural arm 22.

A bundle 58 of cables are held by a suitable number of cable holders 56 within the cable housing element 50 of the cable laying arm 20. One end of the bundle 58 of cables can be extended through the hollow shaft 40 into the robot trunk 12 and can be electrically and mechanically connected to the electric connector held by the holding member 36 disposed within the robot trunk 12, and the other end of the bundle 58 of cables can be extended through the hollow shaft 42 into the second structural arm 22 and can be electrically and mechanically connected to the electric connector 38 disposed within the second structural arm 22. The bundle 58 of cables is held stably on the cable holders 56 fixed to the base elements 46a and 46b.

A cover 60 is fixed with screws 62 to the outermost side of the cable housing element 50. When necessary, the cover 60 is removed from the cable housing element 50 to handle the bundle 58 of cables in a cable chamber 64. Therefore, for example, when repairing a disconnected cable among those of the bundle 58, the disconnected cable can be readily selected out of the cable of the bundle 58 for appropriate repair.

The cable laying arm 20 thus constructed and the first structural robot arm 18 are supported on the robot trunk 12 opposite to each other to form a dual arm structure interposed between the robot trunk 12 and the second structural arm 22. The cable laying arm 20 is formed as an independent unit which can be readily removed together with the cable housing element 50 from the robot unit by loosening the bolts 52 and separating the base elements 46a and 46b respectively from the robot trunk 12 and the second structural robot arm 22. Accordingly, the cable laying arm 20 serves morphologically as part of the robot arm and functionally as a cable laying arrangement; that is, the cable laying arm 20 is not a robot element having necessary mechanical strength and working functions, but an element forming a wiring passage and a guide passage for power supply cables and signal transmission cables. Accordingly, the cable laying arm 20 may be formed of metal sheets or a synthetic resin provided that the cable laying arm 20 has a mechanical strength sufficient for supporting the cables.

When failure, such as disconnection, occurs in a cable in the bundle 58 while the industrial articulated robot is in operation, the whole cable laying arm 20 can be readily removed from the robot unit by separating the same from the side surfaces of the robot trunk 12 and the second structural arm 22, and disconnecting the opposite ends of the cables of the bundle 58 from the connector holding members 36 and 38 disposed respectively within the robot trunk 12 and the second structural arm 22. When necessary, the defective cable laying arm 20 may be replaced with a spare cable laying arm of the same construction as the cable laying arm 20 to reduce the downtime of the industrial articulated robot to the least extent so that the reduction of the operating ratio of the industrial articulated robot is prevented. The defective cable laying arm 20 removed from the robot unit is taken to a repair room, the cover 60 may be removed from the cable housing element 50, the whole bundle 58 of cables or the defective cable may be taken out from the cable housing element 50 and the defective cable may be repaired.

Although the cable laying arrangement in this embodiment has been described as applied to an industrial vertical articulated robot as shown in FIG. 1, naturally, a similar cable laying arrangement can be used for forming a dual arm structure for an industrial horizontal multi-articulated robot.

As is apparent from the foregoing description, according to the present invention, in an industrial robot provided with a cable laying arrangement for laying power supply cables and signal transmission cables through a robot arm pivotally jointed to a robot trunk mounted on the robot base by a joint to feed power and to transmit signals to a robot wrist connected to the extremity of the robot arm and to an end effector connected to the robot wrist, the robot arm is provided with a structural arm pivotally joined to the robot trunk by a joint and capable of driven by the rotative driving force of a drive source, and a cable laying arm pivotally and detachably connected to the robot trunk by a joint opposite to the structural arm with respect to the robot trunk, interlocked with the structural arm, and having a cable chamber in which the cables are extended and a cable passage formed in the middle portion of the joint. Since the cables are not exposed to the exterior, there is no possibility that the life of the cables is reduced due to the deterioration of the quality of the cables attributable to foul matters that adhere to the cables, even if the industrial robot is operated in a contaminated environment, such as a machining workshop contaminated with mists of cutting oils. Since the cable laying arrangement in accordance with the present invention is formed in an independent, unitary element capable of detachably connected to the side surface of the robot unit, the whole cable laying arrangement can be replaced with a spare cable laying arrangement in case a cable contained in the cable laying arrangement is disconnected, so that the downtime of the industrial robot can be reduced to the least extent. On the other hand, the disconnected cable can be selected from among those contained in the cable laying arrangement removed from the robot unit and can be simply repaired.

We claim:

1. An industrial robot comprising a robot base, a robot trunk mounted on the robot base, a robot arm means pivotally connected to the robot trunk by a joint, a robot wrist connected to the extremity of the robot arm means, an end effector connected to the robot wrist, and a cable laying means for laying power supply cables and signal transmission cables from the robot arm means to the robot wrist and the end effector; characterized in that:

said robot arm means is provided with a structural arm member for swing motion about an axis of said joint by a rotative driving force of a drive source, and said cable laying means is provided with a cable laying arm pivotally and detachably connected to said robot trunk by said joint, combined with said structural arm member in such a manner that said cable laying arm and said structural arm member are disposed respectively on the opposite sides of said robot trunk, operatively interlocked with said structural arm member, and having a cable chamber in which said cables are extended and a cable passage formed in a central portion of said joint.

2. An industrial robot according to claim 1, wherein said robot arm means is further provided with a second structural arm member pivotally connected to the extremity of said structural arm member by a second joint, each of said cables contained in said cable chamber of said cable laying arm of said cable laying means has one end fixedly provided with a first connector detachably connected to a connector provided within said robot trunk and the other end fixedly provided with a second connector detachably connected to a connector provided within said second structural arm member.

3. An industrial robot according to claim 2, wherein said cable laying arm comprises at least two hollow shafts having cable passages and disposed apart from each other, sheet metal members fixedly holding the hollow shafts, respectively, rotary bearings mounted on said hollow shafts, respectively, and a cable housing element put on said rotary bearings, forming said cable chamber, and having an aperture opening outside, and said sheet metal members are attached respectively to said robot trunk and said second structural arm member.

4. An industrial robot according to claim 3, wherein said cable laying arm is further provided with a cover member capable of being detachably attached to said cable housing element to close said aperture of said cable housing element opening from the outside.

5. An industrial robot according to claim 3, wherein said cable laying arm includes cable holding members provided within said cable chamber to lay said cables stably in said cable chamber.

6. An industrial robot according to claim 1, wherein said structural arm member of said robot arm is internally provided with strengthening ribs.

* * * * *